United States Patent
Finn

(10) Patent No.: US 12,521,662 B2
(45) Date of Patent: Jan. 13, 2026

(54) FILTER SYSTEM HAVING KEY-FIT ATTACHMENT BETWEEN HOLDER AND FILTER CONNECTOR

(71) Applicant: Caterpillar Inc., Peoria, IL (US)

(72) Inventor: Timothy Sean Finn, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 444 days.

(21) Appl. No.: 18/167,920

(22) Filed: Feb. 13, 2023

(65) Prior Publication Data
US 2024/0269590 A1 Aug. 15, 2024

(51) Int. Cl.
*B01D 46/00* (2022.01)
*B01D 46/24* (2006.01)
*B01D 46/64* (2022.01)

(52) U.S. Cl.
CPC ..... *B01D 46/0005* (2013.01); *B01D 46/0004* (2013.01); *B01D 46/24* (2013.01); *B01D 46/64* (2022.01); *B01D 2265/021* (2013.01); *B01D 2265/029* (2013.01); *B01D 2279/60* (2013.01)

(58) Field of Classification Search
CPC ............ B01D 46/0004; B01D 46/0005; B01D 46/24; B01D 46/2403; B01D 46/2411; B01D 46/2414; B01D 46/64; B01D 29/58; B01D 35/306; B01D 2265/021; B01D 2265/025; B01D 2265/026; B01D 2265/029; B01D 2279/60; B01D 2201/4015; B01D 2201/4053; B01D 2201/4076; B01D 2201/4092
See application file for complete search history.

(56) References Cited

U.S. PATENT DOCUMENTS

| | | | | |
|---|---|---|---|---|
| 4,245,753 A | * | 1/1981 | Ellis | B44D 3/127 215/318 |
| 4,245,754 A | * | 1/1981 | Ellis | B44D 3/12 215/318 |
| 6,814,243 B2 | | 11/2004 | Amstutz et al. | |
| 7,237,682 B2 | | 7/2007 | Reynolds et al. | |
| 8,202,341 B2 | | 6/2012 | Becker et al. | |
| 8,382,415 B1 | | 2/2013 | Goldbaum | |
| 9,092,035 B2 | | 7/2015 | Koganei | |
| 9,925,480 B2 | | 3/2018 | Luther et al. | |
| 11,511,223 B2 | | 11/2022 | Decugniere | |

(Continued)

FOREIGN PATENT DOCUMENTS

| | | |
|---|---|---|
| DE | 3148043 A1 | 6/1983 |
| DE | 202012100969 U1 | 5/2012 |
| KR | 20170053788 A | 5/2017 |

*Primary Examiner* — Robert Clemente

(57) ABSTRACT

A filter system for a machine system includes a filter holder assembly having a filter holder, an inner filter connector, and an outer filter connector. The filter holder includes peripheral surfaces each configured with at least one thread section and at least one slot section. The filter system also includes an inner filter attached to the inner filter connector and an outer filter attached to the outer filter connector. Each of the inner filter connector and the outer filter connector includes a peripheral surface configured with at least one thread section and at least one slot section arranged in a key-fit pattern relative to one of the peripheral surfaces of the filter holder. In an example application the concepts may be applied in an intake air system for an engine in an off-highway machine.

19 Claims, 4 Drawing Sheets

(56) References Cited

U.S. PATENT DOCUMENTS

2008/0229722 A1* 9/2008 Bauder ............... F02M 35/024
                                                                                 55/493
2009/0242470 A1* 10/2009 Muenkel ............... F01M 13/04
                                                                                 210/236
2021/0129050 A1* 5/2021 Joscher ............... B01D 29/111

* cited by examiner

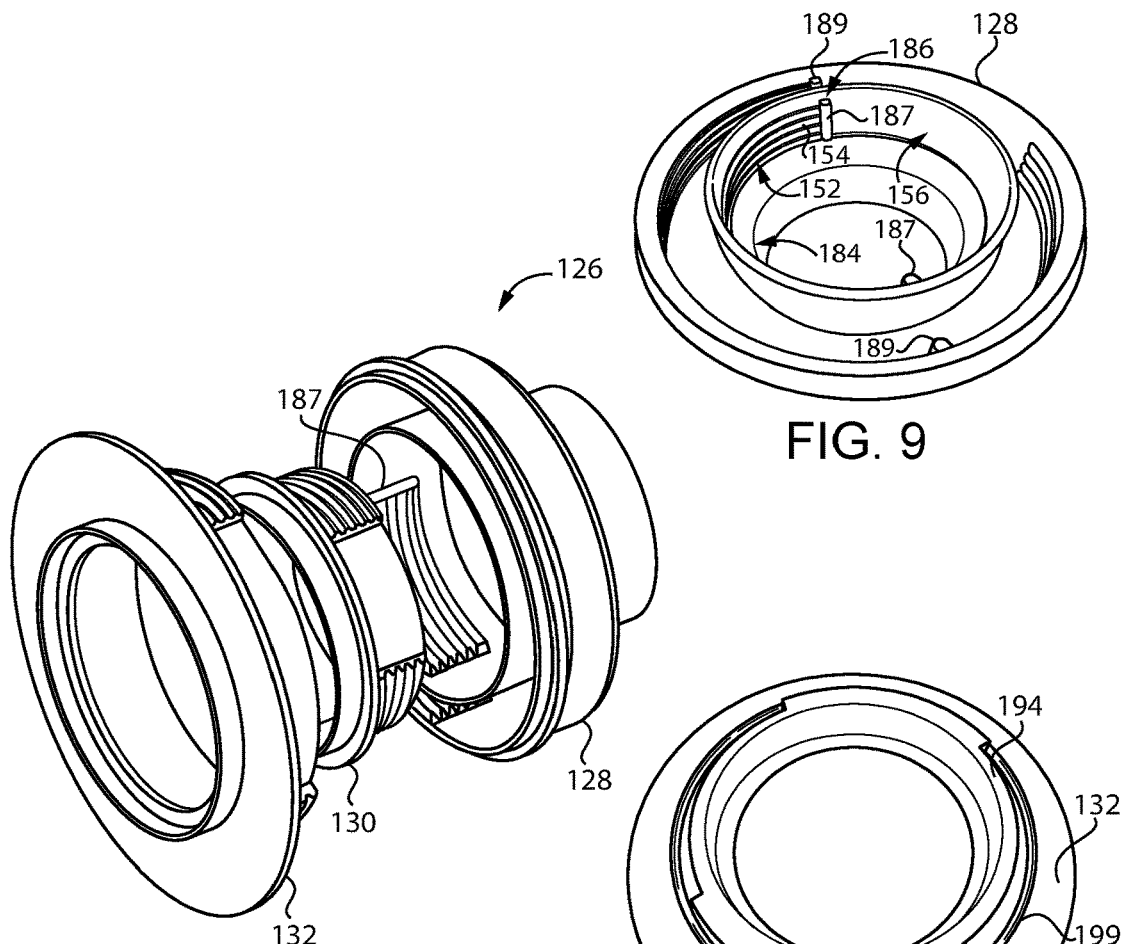
FIG. 8
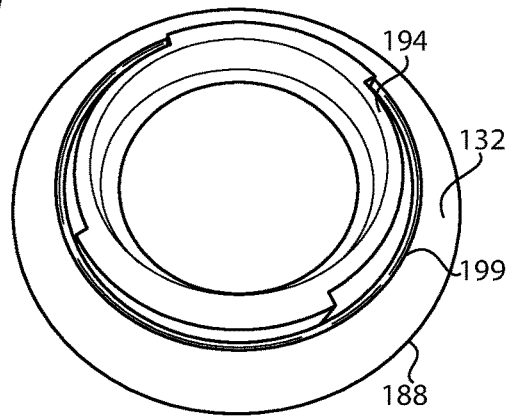
FIG. 9
FIG. 10
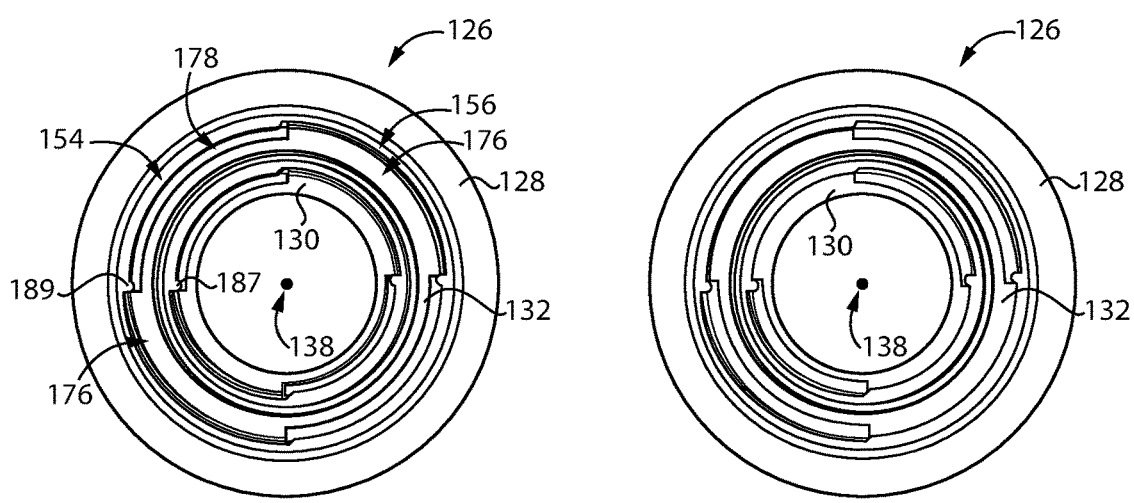
FIG. 11
FIG. 12

FILTER SYSTEM HAVING KEY-FIT ATTACHMENT BETWEEN HOLDER AND FILTER CONNECTOR

TECHNICAL FIELD

The present disclosure relates generally to a serviceable filter system for a machine, and more particularly to a filter holder assembly having an inner filter connector and an outer filter connector configured for key-fit attachment to a filter holder.

BACKGROUND

All manner of machinery systems are known throughout the world which employ filters for various purposes. Most, if not all, internal combustion engines filter intake air to remove debris and particulates that can interfere with operation of the engine or the combustion process itself. In off-highway machinery environments the necessity of filtering air to be supplied to an engine in a machine is critical. A wide variety of filter types have been used for well over a century.

As particles are collected in the filter media the efficacy of the filter can degrade over time, potentially leading to a pressure drop through the filter that is too high, fluid leaks, or other problems. For these reasons it is generally conventional practice to change out air filters on a regular service interval, or when diagnostic equipment indicates a filter change is needed.

Filter disassembly, removal, and reinstallation is desirably a simple and easy task. For various reasons, however, filter swapping in the field is often more time consuming and labor intensive than theoretically required.

Filters and related equipment often employ some type of mechanism for securely locking or positioning a filter in place. One common example of a filter installation and securing or locking mechanism includes a threaded interface. Threaded interfaces between filter components are common and have a long history of use. Certain drawbacks are nevertheless inherent to threaded designs. The force needed to connect two components may require a significant number of threads to be engaged. Numerous revolutions of an inserted part, including a filter or related components, may be required. Threaded components may also be susceptible to misalignment, i.e. cross-threading, which can result in one or more of the parts being permanently damaged. Threaded components may also be formed from relatively soft material such as plastic or aluminum and can be inadvertently tightened beyond the yield limit of the materials. These and other problems can be magnified when the threaded components are large, as is commonly the case in the off-highway machinery environment. One example replaceable filter configuration in a liquid filter context is known from U.S. Pat. No. 6,814,243B2 to Amstutz et al.

SUMMARY

In one aspect, a filter system includes a filter holder assembly including a filter holder, an inner filter connector, and an outer filter connector. The filter holder includes a radially inward holder peripheral surface and a radially outward holder peripheral surface each extending circumferentially around a longitudinal axis and each formed, respectively, by at least one thread section and at least one slot section. The filter system further includes an inner filter attached to the inner filter connector, and the inner filter connector having an inner-filter peripheral surface formed by at least one thread section and at least one slot section arranged in a key-fit pattern relative to the radially inward holder peripheral surface. The filter system further includes an outer filter attached to the outer filter connector, and the outer filter connector having an outer-filter peripheral surface formed by at least one thread section and at least one slot section arranged in a key-fit pattern relative to the radially outward holder peripheral surface.

In another aspect, a filter connector for a filter in a machine system includes a connector body having a flange extending circumferentially around a central opening centered on a longitudinal axis. The flange includes a media-attachment side facing a first axial direction, and the connector body further includes a mounting wall projecting in a second axial direction from the flange. The mounting wall includes an axial end surface, and a peripheral surface extending axially between the axial end surface and the flange. The peripheral surface is formed by a plurality of thread sections each including threads, and a plurality of slot sections. The plurality of slot sections are in an alternating arrangement, circumferentially around the longitudinal axis, with the plurality of thread sections, and are each recessed in a radially inward direction relative to the plurality of thread sections.

In still another aspect, a filter holder includes a holder body having a central opening formed therein centered on a longitudinal axis, and including a radially inward wall and a radially outward wall each extending circumferentially around the longitudinal axis and projecting in a first axial direction. The holder body further includes an outlet pipe section fluidly connected to the central opening and projecting in a second axial direction. The radially inward wall includes a radially inward peripheral surface and the radially outward wall includes a radially outward peripheral surface. Each of the radially inward peripheral surface and the radially outward peripheral surface are formed by a plurality of thread sections each including threads, and a plurality of slot sections defined between adjacent ones of the plurality of thread sections, in an alternating arrangement circumferentially around the longitudinal axis.

BRIEF DESCRIPTION OF THE DRAWINGS

FIG. 8 is a disassembled view of a filter holder assembly, according to another embodiment;

FIG. 9 is a diagrammatic view of a filter holder, as in FIG. 8;

FIG. 10 is a diagrammatic view of a filter connector, as in FIG. 8;

FIG. 11 is an axial sectioned view of a filter holder assembly in an installation configuration;

FIG. 12 is an axial sectioned view of a filter holder assembly in a locked configuration;

DETAILED DESCRIPTION

Figure 1:
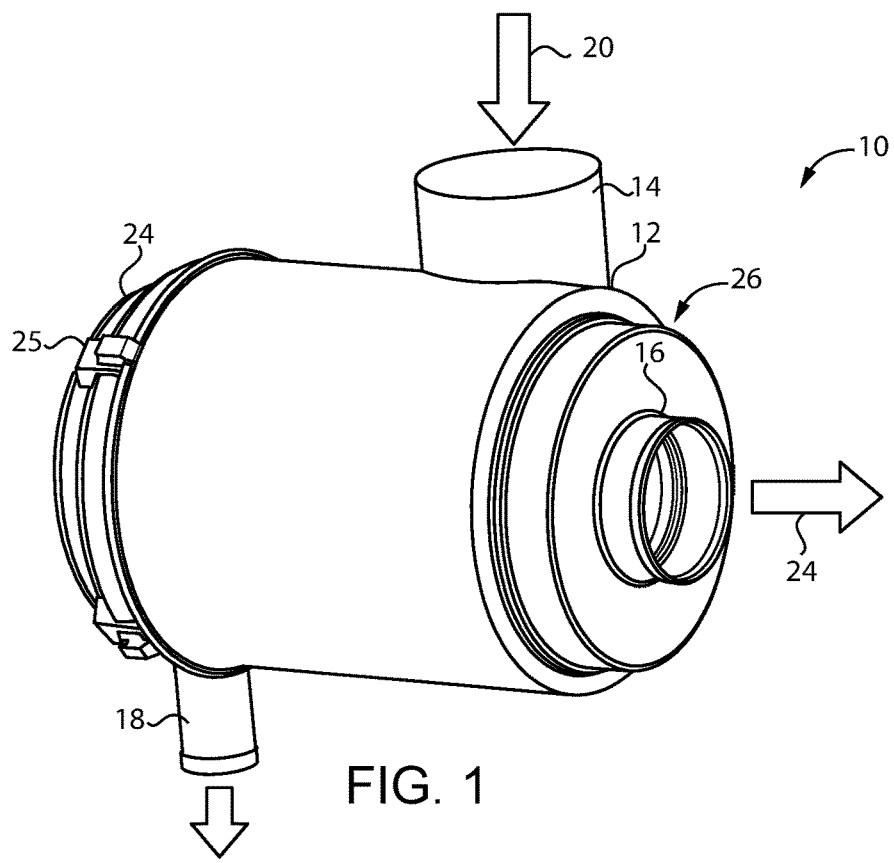
FIG. 1 is a diagrammatic view of a filter system, according to one embodiment.

Referring to FIG. 1, there is shown a filter system 10, according to one embodiment. Filter system 10 includes a housing or canister 12 having an inlet conduit 14, and an outlet conduit 16. An incoming flow 20 of fluid to be filtered enters intake conduit 14, is filtered by way of filtration apparatus in canister 12, and an outgoing flow 24 of filtered fluid exits by way of outlet conduit 16. Canister 12 may further include a secondary outlet conduit 18. In some implementations heavier or larger debris material can be discharged by way of secondary outlet conduit 18, with finer debris, et cetera., being trapped by the filtration apparatus. Canister 12 may also include a removable cover 24 and a plurality of fasteners 25, such as fasteners in the nature of manually operable clasps or clips that can be used to selectively secure cover 24 to a main portion of canister 12.

In an implementation filter system 10 may be used to filter intake air for an internal combustion engine powering an off-highway machine such as a track-type tractor, a wheel loader, a truck, a scraper, or many others. As suggested above off-highway working environments can be quite dusty or otherwise associated with relatively large amounts of airborne debris. For this reason, it is generally desirable to service filter system 10 at defined service intervals, or where it is otherwise determined that service is needed. A service technician can, in one example, remove cover 24 and replace one of two filters in filter system 10, and reinstall the other of the two. In other instances each of two filters positioned within canister 12 may be replaced. Still other implementations might include more than two filters, or potentially in some instances only one. The present disclosure is not limited with regard to any particular service interval or number or proportion of filters replaced at any one time. In one practical implementation, a primary, outer filter will be replaced once for every three times that a secondary, inner filter is replaced. The secondary, inner filter may be a so-called safety filter as further discussed herein.

Figure 2:
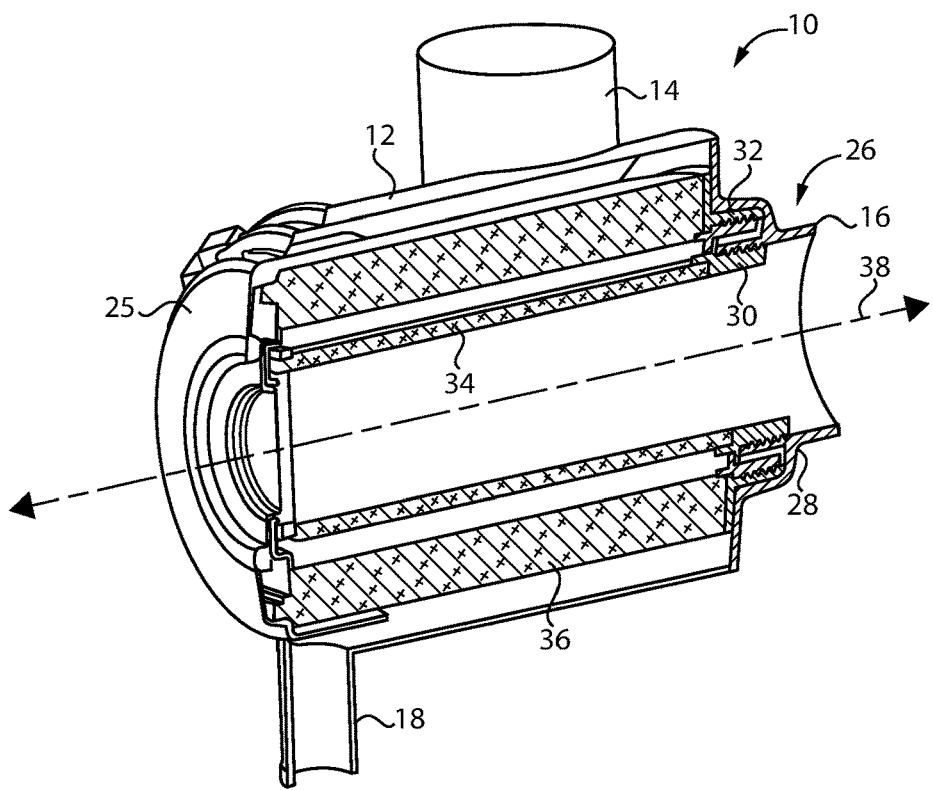
FIG. 2 is a sectioned diagrammatic view of a filter system as in FIG. 1.

Referring also now to FIG. 2, there is shown a sectioned view of filter system 10 illustrating additional details. Filter system 10 may include a filter holder assembly 26 including a filter holder 28, an inner filter connector 30, and an outer filter connector 32. Filter holder 28 may be attached to, or potentially formed integrally with, canister 12. For service, cover 24 can be removed and filter system 10 serviced by removing apparatus approximately in a leftward direction, and installing apparatus approximately in a rightward direction, in the FIG. 2 illustration.

Figure 3:
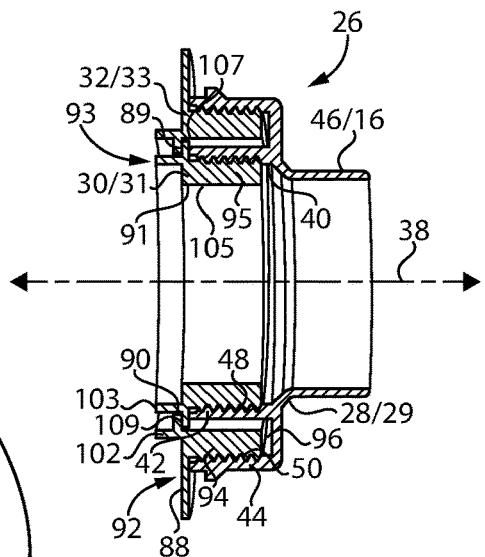
FIG. 3 is a sectioned side diagrammatic view of a filter holder assembly, according to one embodiment.
Figure 4:
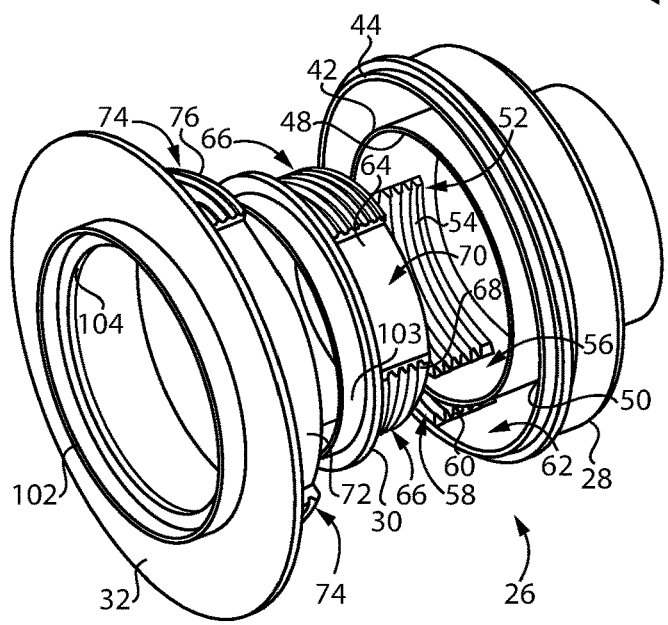
FIG. 4 is a disassembled view of a filter holder assembly as in FIG. 3.

Filter holder assembly 26 defines a longitudinal axis 38. Referring also now to FIGS. 3 and 4, filter holder 28 includes a holder body 29, inner filter connector 30 includes a connector body 31, and outer filter connector 32 includes a connector body 33. Each of filter holder 28, inner filter connector 30, and outer filter connector 32 may be formed as a one-piece body, such as a molded plastic body or a machined or cast aluminum body, or a part formed by additive manufacturing, to name a few examples. Each of filter holder 28, inner filter connector 30, and outer filter connector 32 may be coaxially arranged about longitudinal axis 38, and each of these parts can be independently understood to define longitudinal axis 38. As depicted in FIG. 2 an inner filter 34 containing a suitable filter media is attached to inner filter connector 30, and an outer filter 36 containing a suitable filter media is attached to outer filter connector 32. The filter media in each case may have a pleated configuration. Outer filter 36 may be a so-called primary filter, and inner filter 34 may be a so-called safety filter. As will be further apparent from the following description, inner filter 34 and outer filter 36 may typically be mounted in filter system 10 such that outer filter 36 must be removed before inner filter 34 may be removed, consistent with the functioning of inner filter 34 as a "safety" filter that stays in place when cover 24 is open and tends not to be inadvertently removed or dislodged, thus protecting an associated air system in an engine from risk of debris intrusion.

As noted above, filter holder 28 includes holder body 29. The terms "filter holder" and "holder body" as well as "filter connector" and "connector body" are used at least at times interchangeably herein. Holder body 29 includes a central opening 40 formed therein and centered on longitudinal axis 38. Holder body 29 also includes a radially inward wall 42 and a radially outward wall 44 each extending circumferentially around longitudinal axis 38 and projecting in a first axial direction, to the left in the FIG. 3 illustration. Holder body 29 also includes an outlet pipe section 46 that may be the same piece or component as outlet conduit 16 in some embodiments. Outlet pipe section 46 is fluidly connected to central opening 40 and projects in a second axial direction, to the right in FIG. 3.

Radially inward wall 42 further includes a radially inward holder peripheral surface 48, and radially outward wall 44 includes a radially outward holder peripheral surface 50. The terms "radially inward" and "radially outward" are used in reference to longitudinal axis 38 and do not necessarily specify a facing direction. At least one of radially inward peripheral surface 48 or radially outward peripheral surface 50 may be an inner peripheral surface, meaning a peripheral surface facing a radially inward direction. In a practical implementation, each of radially inward peripheral surface 48 and radially outward peripheral surface 50 is an inner peripheral surface.

Each of radially inward peripheral surface 48 and radially outward peripheral surface 50 may have a similar configuration for attachment to inner filter connector 30 and outer filter connector 32, respectively. Radially inward peripheral surface 48 is formed by at least one, and typically a plurality, of thread sections 52 each including threads 54, and at least one, typically a plurality, of slot sections 56 defined between adjacent ones of the plurality of thread sections 52, in an alternating arrangement circumferentially around longitudinal axis 38. Radially outward peripheral surface 50 is formed by at least one, and typically a plurality, of thread sections 58 each including threads 60, and at least one, typically a plurality, of slot sections 62 defined between adjacent ones of the plurality of thread sections 58, in an alternating arrangement circumferentially around longitudinal axis 38. In the illustrated embodiment, each of the respective plurality of thread sections 52 and 58 includes internal threads. Also in the illustrated embodiment, each respective plurality of thread sections 52 and 58 includes a total of two thread sections. Analogously, a total of two slot sections 56 and 62 in each case may be used.

As noted above, inner filter 34 is attached to inner filter connector 30. Inner filter connector 30 may have an inner-filter peripheral surface 64 formed by at least one, and typically a plurality, of thread sections 66 having threads 68, and at least one, and typically a plurality, of slot sections 70. The at least one thread section 66 and at least one slot section 70 may be arranged in a key-fit pattern relative to radially inward peripheral surface 48.

As also noted above, an outer filter 36 may be attached to outer filter connector 32. Outer filter connector 32 includes an outer-filter peripheral surface 72 formed by at least one, and typically a plurality, of thread sections 74 having threads 76, and at least one, typically a plurality, of slot sections 78. The at least one thread section 74 and at least one slot section 78 may be arranged in a key-fit pattern relative to radially outward peripheral surface 50.

Figure 6:
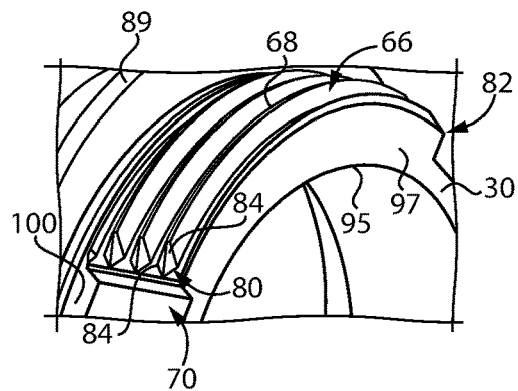
FIG. 6 is a diagrammatic view of a portion of an inner filter connector, according to one embodiment.
Figure 7:
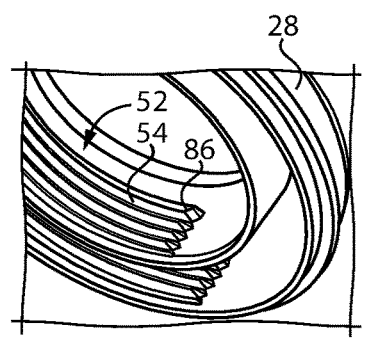
FIG. 7 is a diagrammatic view of a portion of a filter holder, according to one embodiment.

Referring also now to FIG. 6, there are shown additional features of a thread section 66 and threads 68. Each of the plurality of thread sections 66 may include an originating end 80 and a terminating end 82. Originating end 80 may include a lead-in end that engages a counterpart thread section in inner filter connector 30. Threads 68 in each of the plurality of thread sections 66 may include lead-in chamfers 84 each located at one of originating ends 80. Referring also to FIG. 7, there is shown filter holder 28 illustrating a thread section 52 having threads 54 each including analogously configured lead-in chamfers 86.

Figure 5:
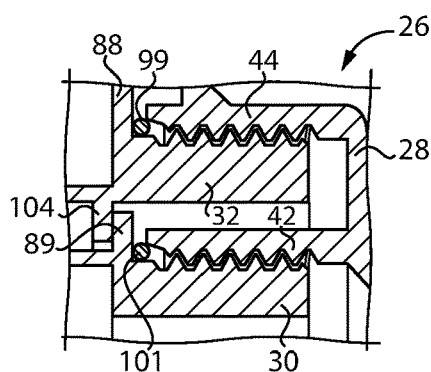
FIG. 5 is a sectioned side diagrammatic view of a portion of a filter holder assembly as in FIGS. 3 and 4.

Focusing again on FIGS. 3 and 4, and also now on FIG. 5, inner filter connector 30, and connector body 31, may include a flange 89 extending circumferentially around a central opening 91 centered on longitudinal axis 38. Outer filter connector 32, and connector body 33, may include a flange 88 also extending circumferentially around a central opening 90 centered on longitudinal axis 38. Each flange 88, 89, may have a media-attachment side 92, 93 facing the first axial direction, to the left in FIG. 3. Each connector body 31, 33 may further include a mounting wall 94, 95 projecting in the second axial direction from the respective flange 88, 89. Mounting walls 94, 95 may each include an axial end surface 96, 97, with the respective peripheral surfaces 64, 72 extending between axial end surfaces 96, 97 (FIG. 6) and the respective flanges 88, 89.

When inner filter connector 30 and outer filter connector 32 are installed in filter holder 28, standoff O-rings 101 and 99 form seals between the respective components. A first O-ring 99 seals between radially outward wall 44 and flange 88, and a second O-ring 101 seals between radially inward wall 42 and flange 89. Installation of inner filter connector 30 and outer filter connector 32 can include moving the respective components together such that thread sections 66 on inner filter connector 30 fit into slot sections 56, and such that thread sections 74 fit into slot sections 62. When inner filter connector 30 is thusly installed in holder 28, inner filter connector 30 and the attached inner filter 34 may be rotated to engage the respective thread sections. Analogously, when outer filter connector 32 is thusly installed in filter holder 28, outer filter connector 32 and outer filter 36 can be rotated to engage the respective thread sections. In an example embodiment, each of inner filter connector 30 and outer filter connector 32 is rotatable one-quarter turn, about 90 degrees, around longitudinal axis 38 from an installation configuration to a locked configuration.

It can be seen from FIG. 5 that the respective thread sections are in appropriate alignment at axial locations for engagement of the respective threads. Absent O-rings 99 and 101, the parts could bottom out against each other, however, resulting in misalignment of the threads. In an actual implementation a user would not be able to perform the rotation to engage the respective sets of threads without the presence of O-rings 99 and/or 101.

As also noted above, inner filter connector 30 typically cannot be disengaged from filter holder 28 when outer filter connector 32 is installed. In the illustrated embodiment flange 88 is an outer flange, and outer filter connector 32, and connector body 33 further include an inner flange 104. Inner flange 104 may be understood to define central opening 90. It can thus be appreciated that inner flange 104 and flange 89 may interfere such that when outer filter connector 32 is installed inner filter connector 30 is trapped in filter holder 28.

It can also be noted from the drawings that slot sections 70, 78 are each recessed in a radially inward direction relative to the respective plurality of thread sections 66, 74. Focusing again on FIG. 6, mounting wall 95 may further include a plurality of arcuate base surfaces 100 each formed at an axial location between flange 89 and threads 68, base surfaces 100 facing the second axial direction. Each of the plurality of slot sections 70 may extend from axial end surface 97 to one of the plurality of arcuate base surfaces 100.

As can also be noted from the drawings, each of inner filter connector 30 and outer filter connector 32 may include, upon the respective media-attachment side 92, 93, a media-attachment wall 102, 103 projecting from the respective flange 88, 89 in the first axial direction. In the case of outer filter connector 32, media-attachment wall 102 may be positioned radially between an inner peripheral surface 109 of connector body 33 that forms central opening 90, and an outer peripheral surface 107 formed by flange 88. A stop surface 109 extends circumferentially around longitudinal axis 38 and radially between media-attachment wall 102 and inner peripheral surface 109. In the case of inner filter connector 30 media attachment wall 103 may be radially outward of an inner peripheral surface forming central opening 91.

Referring now to FIGS. 8-12, there is shown a filter holder assembly 126 according to another embodiment, and including a filter holder 128, an inner filter connector 130, and an outer filter connector 132. Filter holder assembly 126 may be similar to filter holder assembly 26 discussed above but having certain differences. Discussion and description herein of any one embodiment should nevertheless be understood to refer to any other embodiment except where otherwise indicated or apparent from the context. Focusing on FIG. 9, filter holder 128 may be configured with a plurality of thread sections 152 having threads 154 and in an alternating arrangement with a plurality of slot sections 156. Each thread section 152 may include an originating end 184 and a terminating end 186. Filter holder 128 may include a plurality of protruding stops 187 at radially inward locations, and a plurality of protruding stops 189 at radially outward locations, and each of protruding stops 187, 189 being located at one of the terminating ends of a thread section.

FIG. 10 shows inner filter connector 132 including a mounting wall 194 and a standoff O-ring 199. O-ring 199 seats between mounting wall 194 and flange 188 and is in contact with each. Filter connector 132 may be configured similarly or identically to other filter connectors discussed herein and is installed into filter holder 128 and rotated from an installation configuration to a locked configuration. Protruding stops 189 can, however, inhibit rotation of filter connector 132 in a direction of rotation opposite to an installation direction of rotation. In other words, a user may position filter connector 132 within filter holder 128 analogous to other embodiments herein, but can only rotate filter connector 132 relative to filter holder 128 in one direction from the installation configuration. This arrangement can prevent damage to or sticking of threads. Inner filter connector 130 may have an analogous structure and functionality with regard to protruding stops 187. FIG. 11 shows filter holder assembly 126 as it might appear with inner filter connector 130 and outer filter connector 132 positioned in filter holder 128 in an installation configuration but not yet rotated. FIG. 12 shows filter holder assembly 126 where inner filter connector 130 and outer filter connector 132 have been rotated to locked configurations about a longitudinal axis 138. It can be noted from comparing FIGS. 11 and 12 that a rotation of one-quarter turn adjusts from the installation configuration to the locked configuration. It can also be seen that an arc length of slot sections 156 is greater than arc length of each of thread sections 152 circumferentially around longitudinal axis 138. Inner filter connector 130 and holder 128 may be analogously configured. Other embodiments may have different relative arc lengths, unequal arc lengths within respective pluralities of thread sections and/or slot sections, different numbers of thread sections and slot sections in different filter connectors of the same filter holder assembly, and still other variations.

Figure 13:
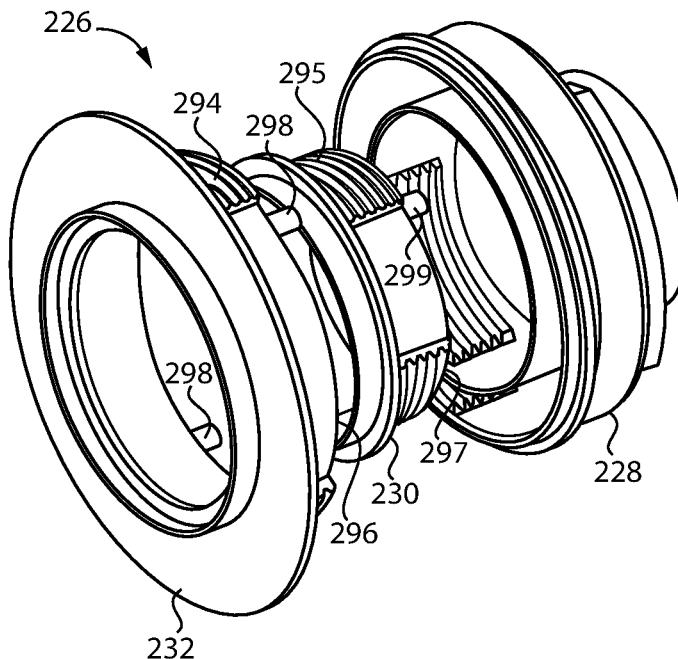
FIG. 13 is a disassembled view of a filter holder assembly, according to another embodiment.
Figure 14:
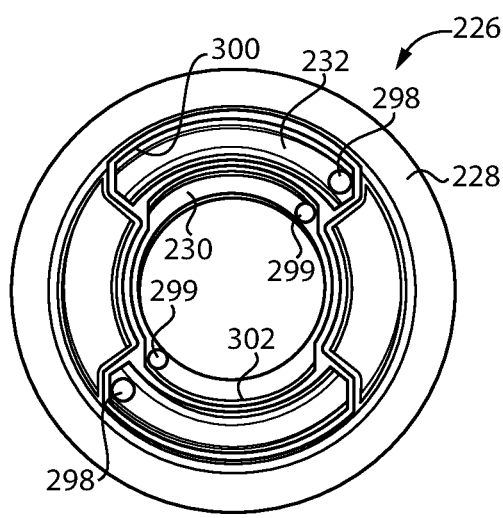
FIG. 14 is an axial view of a filter holder assembly as in FIG. 13.

Turning now to FIG. 13, there is shown still another embodiment of a filter holder assembly 226 according to the present disclosure, and including a filter holder 228, and an inner filter connector 230, and an outer filter connector 232. Inner filter connector 230 includes a mounting wall 295 having an axial end surface 297. Outer filter connector 232 includes a mounting wall 294 having an axial end surface 296. A plurality of protruding pegs 298 extend from axial end surface 296. A plurality of protruding pegs 299 extend from axial end surface 297. Referring also to FIG. 14, protruding pegs 299 may be received in channels 302 formed in filter holder 228. Protruding pegs 298 may be received in channels 300 formed in filter holder 228. An interaction between protruding pegs 298, 299 and channels 300, 302 can limit rotation of filter connectors 230 and 232 to an installation direction of rotation, generally analogous to the embodiment of FIG. 8.

Figure 15:
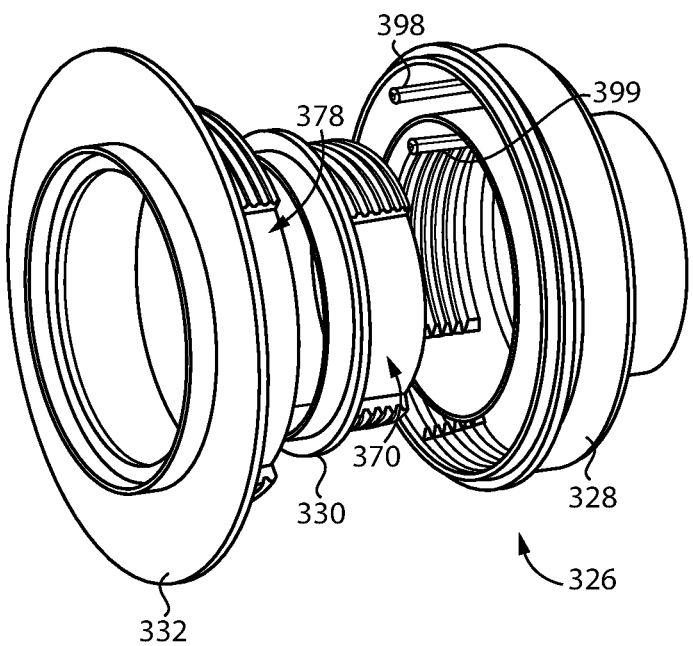
FIG. 15 is a disassembled view of a filter holder assembly, according to yet another embodiment.

Turning now to FIG. 15, there is shown a filter holder assembly 326 having a filter holder 328, an inner filter connector 330, and an outer filter connector 332. Outer filter connector 332 includes a plurality of slot sections 378 analogous to other embodiments. Inner filter connector 330 also includes slot sections 370. In this implementation protruding pegs 399 can be received in slot sections 370, and protruding pegs 398 can be received in slot section 378. This arrangement is again generally analogous to other embodiments discussed herein where rotation between the respective components is possible in an installation direction, but prevented in an opposite direction.

INDUSTRIAL APPLICABILITY

Referring to the drawings generally, as discussed herein it can be desirable to swap out used filters for fresh filters on a periodic basis or as needed. Typically the inner filter or safety filter is replaced less often than the primary filter. In the embodiment of FIG. 1, a user can remove cover 24, manually, or with the assistance of a tool, grasp outer filter 36, and rotate outer filter 36 approximately a one-quarter turn and slide outer filter 36 out of canister 12.

If inner filter 34 is to be replaced, it can analogously be rotated approximately one quarter turn and slid out of canister 12. A replacement filter for inner filter 34 can then be installed and rotated to a locked configuration. If outer filter 36 is being replaced, then a new replacement filter can be installed over the existing or replacement inner filter 34 and rotated to lock in place. It will be recalled that inner filter 34 may not be removable without first removing outer filter 36. With one or more replacement filters installed and nested together within canister 12, cover 24 can be reattached and a filtered fluid flow path from a fluid inlet formed by inlet conduit 14 and a fluid outlet formed by outlet conduit 16 established. The machinery utilizing filter system 10 can then be returned to service.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having." or the like are intended to be open-ended terms. Further, the phrase "based on" is intended to mean "based, at least in part, on" unless explicitly stated otherwise.

What is claimed is:

1. A filter system comprising:
   a filter holder assembly including a filter holder, an inner filter connector, and an outer filter connector;
   the filter holder having a radially inward holder peripheral surface and a radially outward holder peripheral surface each extending circumferentially around a longitudinal axis and each formed, respectively, by at least one thread section and at least one slot section;
   an inner filter attached to the inner filter connector, and the inner filter connector having an inner-filter peripheral surface formed by at least one thread section and at least one slot section arranged in a key-fit pattern relative to the radially inward holder peripheral surface; and
   an outer filter attached to the outer filter connector, and the outer filter connector having an outer-filter peripheral surface formed by at least one thread section and at least one slot section arranged in a key-fit pattern relative to the radially outward holder peripheral surface.

2. The filter system of claim 1 further comprising a canister having a fluid inlet and a fluid outlet, and the inner filter and the outer filter are nested together within the canister and form a filtered fluid flow path from the fluid inlet to the fluid outlet.

3. The filter system of claim 2 wherein the fluid outlet is formed in the filter holder.

4. The filter system of claim 1 wherein:
   the filter holder includes a radially inward wall having the radially inward holder peripheral surface formed thereon, and a radially outward wall having the radially outward holder peripheral surface formed thereon; and
   each of the radially inward holder peripheral surface and the radially outward holder peripheral surface is an outer peripheral surface.

5. The filter system of claim 1 wherein each of the inner-filter peripheral surface and the outer-filter peripheral surface is formed by a plurality of thread sections and a plurality of slot sections.

6. The filter system of claim 5 wherein each respective plurality of thread sections includes a total of two thread sections, and each respective plurality of slot sections includes a total of two slot sections.

7. The filter system of claim 6 wherein each of the inner filter connector and the outer filter connector is rotatable one-quarter turn around the longitudinal axis from an installation configuration to a locked configuration.

8. A filter connector for a filter in a machine system comprising:
- a connector body including a flange extending circumferentially around a central opening centered on a longitudinal axis, the flange having a media-attachment side facing a first axial direction, and the connector body further including a mounting wall projecting in a second axial direction from the flange;
- the mounting wall including an axial end surface, a plurality of arcuate base surfaces, and a peripheral surface extending axially between the axial end surface and the flange;
- the peripheral surface being formed by a plurality of thread sections each including threads, and a plurality of slot sections;
- the plurality of arcuate base surfaces each formed at an axial location between the flange and the threads and facing the second axial direction;
- the plurality of slot sections are in an alternating arrangement, circumferentially around the longitudinal axis, with the plurality of thread sections, and are each recessed in a radially inward direction relative to the plurality of thread sections; and
- each of the plurality of slot sections extending from the first axial end surface to one of the plurality of arcuate base surfaces.

9. The filter connector of claim 8 further comprising a standoff O-ring positioned upon the connector body and in contact with the flange and the mounting wall.

10. The filter connector of claim 8 wherein the threads include external threads, and an arc length of each of the plurality of slot sections is greater than an arc length of each of the plurality of thread sections, circumferentially around the longitudinal axis.

11. The filter connector of claim 10 wherein:
the plurality of thread sections includes a total of two thread sections, and the plurality of slot sections includes a total of two slot sections;
the flange is an outer flange, and the connector body further includes an inner flange defining the central opening.

12. The filter connector of claim 8 wherein:
the connector body further includes a media-attachment wall projecting from the flange in the first axial direction;
the media-attachment wall is positioned radially between an inner peripheral surface of the connector body forming the central opening, and an outer peripheral surface formed by the flange; and
a stop surface extends circumferentially around the longitudinal axis and radially between the media-attachment wall and the flange.

13. The filter connector of claim 8 wherein the connector body further includes protruding pegs extending from the axial end surface in the second axial direction.

14. A filter holder comprising:
- a holder body having a central opening formed therein centered on a longitudinal axis, and including a radially inward wall and a radially outward wall each extending circumferentially around the longitudinal axis and projecting in a first axial direction, and an outlet pipe section fluidly connected to the central opening and projecting in a second axial direction;
- the radially inward wall including a radially inward peripheral surface, and the radially outward wall including a radially outward peripheral surface; and
- each of the radially inward peripheral surface and the radially outward peripheral surface being formed by a plurality of thread sections each including threads, and a plurality of slot sections defined between adjacent ones of the plurality of thread sections, in an alternating arrangement circumferentially around the longitudinal axis.

15. The filter holder of claim 14 wherein at least one of the radially inward peripheral surface or the radially outward peripheral surface is an inner peripheral surface.

16. The filter holder of claim 15 wherein each respective plurality of thread sections includes internal threads.

17. The filter holder of claim 15 wherein each respective plurality of thread sections includes a total of two thread sections.

18. The filter holder of claim 14 wherein each respective plurality of thread sections includes an originating end and a terminating end, and the holder body further includes a plurality of protruding stops each located at one of the terminating ends.

19. The filter holder of claim 18 wherein the threads in each of the plurality of thread sections include lead-in chamfers at the respective originating end.

\* \* \* \* \*